United States Patent [19]

Binley et al.

[11] Patent Number: 4,923,706
[45] Date of Patent: May 8, 1990

[54] PROCESS OF AND APPARATUS FOR SHAPING EXTRUDABLE MATERIAL

[75] Inventors: Gary N. Binley, Kettering; Alan F. Giles, St. Neots; Christopher A. Pearson, Harpenden; Terence P. Baker, Rushden, all of Great Britain

[73] Assignee: Thomas J. Lipton, Inc., Englewood Cliffs, N.J.

[21] Appl. No.: 296,717

[22] Filed: Jan. 12, 1989

[30] Foreign Application Priority Data

Jan. 14, 1988 [GB] United Kingdom ............... 8800764
Mar. 28, 1988 [GB] United Kingdom ............... 8807450

[51] Int. Cl.$^5$ .................. A23G 9/04; A23G 9/22; B29C 47/12; B29C 47/92
[52] U.S. Cl. .................. 426/516; 264/40.1; 264/40.7; 264/177.11; 264/211.1; 264/211.11; 425/146; 425/325; 425/375; 425/382.3; 425/463; 425/464; 426/249; 426/565
[58] Field of Search ........... 264/40.1, 40.7, 177.1, 264/177.11, 211.1, 211.11; 425/145, 146, 319, 325, 375, 382.3, 463, 464; 426/249, 516, 565

[56] References Cited

U.S. PATENT DOCUMENTS

| | | | |
|---|---|---|---|
| 2,429,042 | 10/1947 | Bader | 425/319 X |
| 2,742,000 | 4/1956 | Hansen et al. | 425/375 |
| 3,878,992 | 4/1975 | MacManus | 425/463 X |
| 3,940,226 | 2/1976 | Verhoeven | 425/375 |
| 4,504,511 | 3/1985 | Binley | 426/565 |
| 4,749,347 | 6/1988 | Valavaara | 425/375 X |

FOREIGN PATENT DOCUMENTS

| | | |
|---|---|---|
| 44689 | 1/1982 | European Pat. Off. |
| 234376 | 9/1987 | European Pat. Off. |
| 61-5771 | 1/1986 | Japan |
| 61-187751 | 8/1986 | Japan ...................... 425/375 |
| 794584 | 5/1958 | United Kingdom |
| 2178995 | 2/1987 | United Kingdom |

Primary Examiner—Jeffery Thurlow
Assistant Examiner—Leo B. Tentoni
Attorney, Agent, or Firm—Brumbauch, Graves, Donohue & Raymond

[57] ABSTRACT

Shaping device and method for shaping extrudable material including at least one extrusion nozzle for feeding extrudable material and being supported in a carrier common to all nozzles, motors for moving either the carrier or a movable support surface for receiving extruded material directly from the nozzles and a programmable computer for controlling the motors.

13 Claims, 2 Drawing Sheets

PROCESS OF AND APPARATUS FOR SHAPING EXTRUDABLE MATERIAL

BACKGROUND OF THE INVENTION

The invention relates to a shaping device for extrudable material, for example for manufacturing food products, and in particular for ice confections, the shaping device comprising at least one extrusion nozzle and a movable support surface arranged at some distance from the nozzle for directly receiving extruded product therefrom, each nozzle having feeding means for extrudable material, all nozzles being arranged on a common carrier, which is at least rotatable with respect to the support surface about an axis of rotation which is not an axis of complete rotational symmetry of all nozzles, and motor means for effecting the relative movement of the carrier and the support surface.

DESCRIPTION OF THE PRIOR ART

An apparatus of this general kind is described and shown in EP 44,689, allowing the manufacture of twisted products. However, there is continuing need of more varied products, either as regards pattern, or ornament, or configuration, or shape, or texture or any combination thereof.

It is the aim of the present invention to provide a method and apparatus for easily manufacturing such varied and complex products.

SUMMARY OF THE INVENTION

According to the invention, this may be realized by using a shaping device of the general kind as described above, the motor means of which are adapted for both relative rotational and translational movement in at least one direction of the carrier and the support surface, the actuation of these motor means being controlled by a programmable computer.

For even more freedom of shape and flexibility of manufacture, the carrier may be mounted in a frame which is movable along guides in at least two orthogonal directions.

For manufacturing products having a height of several centimeters, it is to be preferred that the carrier be movable up and down with respect to the support surface.

Even more variegation can be accomplished if the nozzles each are provided with valve means, the action of which is controlled by the same computer as the motor means, which valve means are arranged at a small distance from the actual nozzle opening so that, in use, no material will be leaking out of the nozzle opening after closing the valve means. Usually, this distance will not be in excess of 5 cm, and more preferably not in excess of 3 cm. As a result, a reliable action is obtained, resulting in shapes of proper definition.

BRIEF DESCRIPTION OF THE DRAWINGS

Some characteristic examples of devices according to the invention are given below and shown in the accompanying drawings, in which.

DESCRIPTION OF THE PREFERRED EMBODIMENTS

Figure 1:
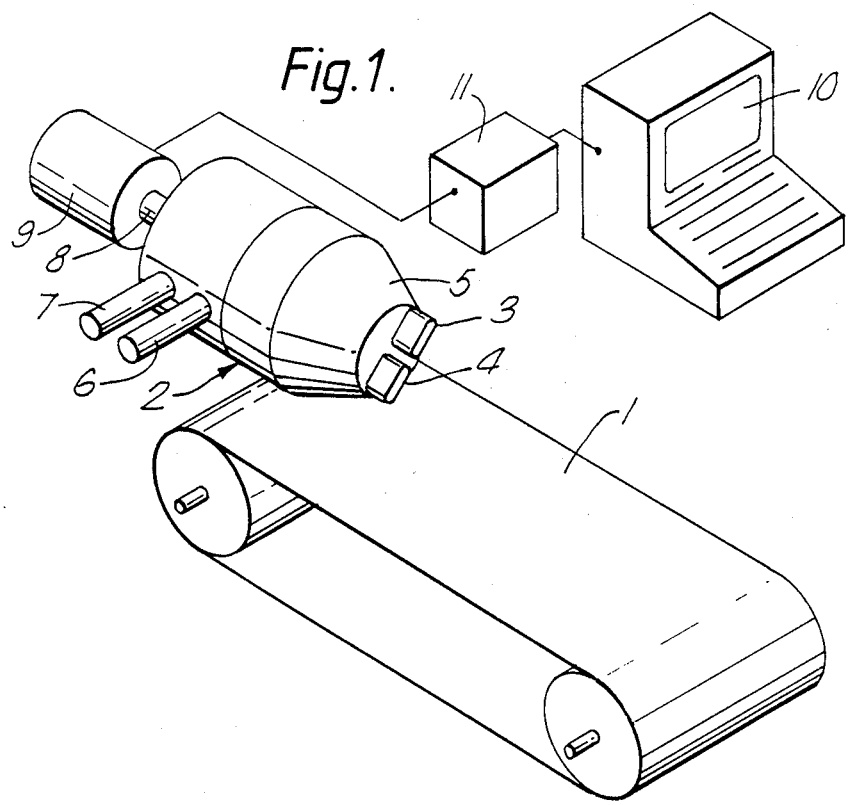
FIG. 1 is a schematic representation of a first embodiment of a device according to the invention.

Referring to the drawing, FIG. 1 shows a belt conveyor 1, forming a supporting surface for directly receiving extruded products from an extrusion device 2 arranged above this conveyor. The extrusion device comprises two nozzles 3,4, which are arranged in a common carrier 5 and which each have separate supply means 6,7, through which extrudable materials may be fed to the nozzles.

The carrier 5 is attached to, and supported by, a central shaft 8 which may be driven for rotation by a stepper motor 9. The actuation, i.e. rotational direction, speed, acceleration, can be controlled at will by a programmable computer 10. Usually, a stepper motor driver unit 11 is arranged between the computer 10 and the motor 9.

Figure 2:
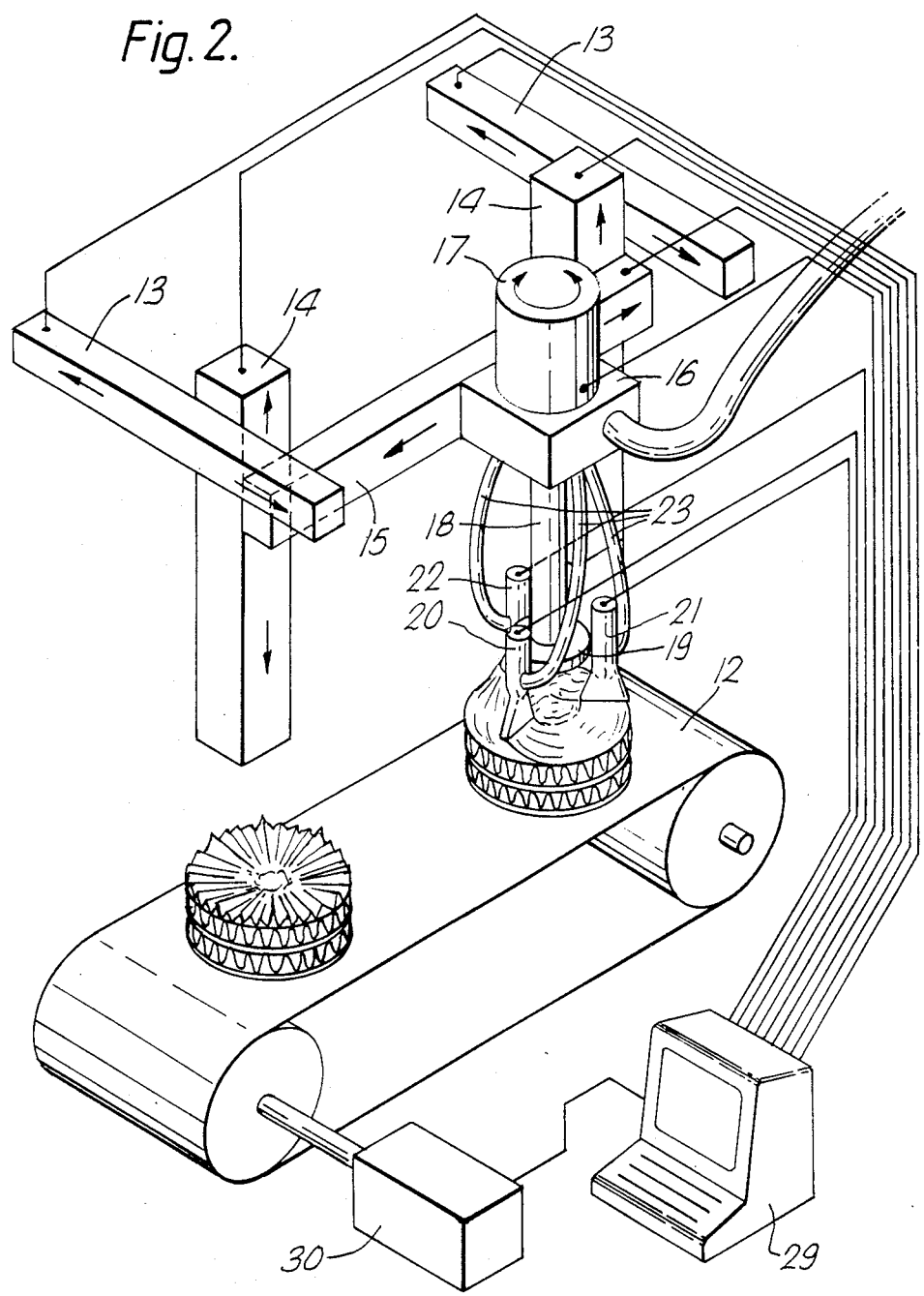
FIG. 2 is a schematic representation of a second embodiment of a device according to the invention.

The device shown in FIG. 2 also comprises a belt conveyor 12, along which guides 13, 14, 15 are arranged in three orthogonal directions. These guides are slidable with respect to each other. Inside the guides, stepper motors (not shown) are accommodated which, by suitable transmission means such as a chain or a worm transmission, may effect a mutual movement of the guides as indicated by the double arrows.

The guide 15 supports a carriage 16, which is slidably arranged on said guide and which supports an extrusion gear. On top of the carriage, a stepper motor 17 is supported, the shaft 18 of which is rotatably supported in the carriage 16. The lower end of the shaft 18 supports a disc-shaped carrier 19, to which, at regular angular distances, extrusion nozzles 20, 21, 22 are attached. The nozzles may be supplied with extrudable material through flexible hoses 23. The flow of material through the nozzles can be controlled by an internal valve, better shown in FIG. 3.

Figure 3:
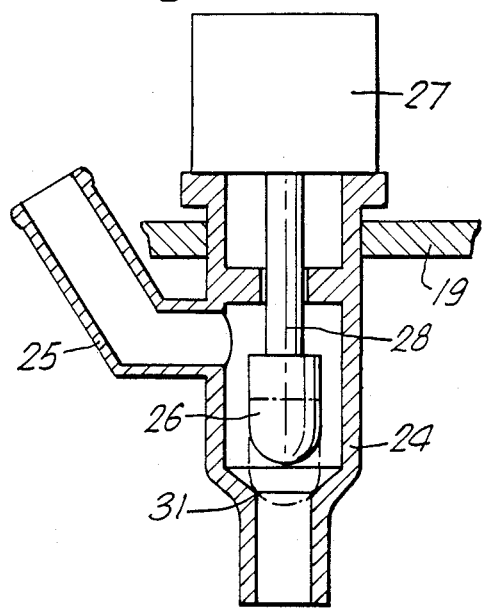
FIG. 3 is a partial sectional view of a nozzle for use in a device according to the invention.

In FIG. 3 a longitudinal section through a nozzle 20 is shown. This nozzle comprises a body 24 supported on the carrier 19. The flexible supply hose 23 is attached to a lateral stud 25, through which material is supplied into the body 24. Inside the body, a valve body 26 can be reciprocated towards and from a valve seat 31 by a motor means 27, such as a pneumatic actuator, which is connected to the valve stem 28. The valve is shown in the open position; the closed position is shown, using interrupted lines.

The motor means 27 of the valves 26, the stepper motor 17 of the carrier 19 and the stepper motors arranged in the guides are connected in a working relationship to a programmable computing means 29. For synchronisation with the conveyor 12, the driving means 30 of said conveyor may be connected to the computing means too.

The term "complete rotational symmetry" in this specification and claims is meant to refer to a figure having rotational symmetry, resulting in a figure of the same shape after rotation by any angle about its axis of symmetry.

The words "move" and "movement" are used in their broadest sense, comprising translation, rotation, vibration, swivel, pivor movement and any combination.

Although stepper motors are preferably used in the devices according to the invention because of their easy control by electronic or computing means, it should be noted that any well-controllable motor can be used for this purpose.

Figure 4:
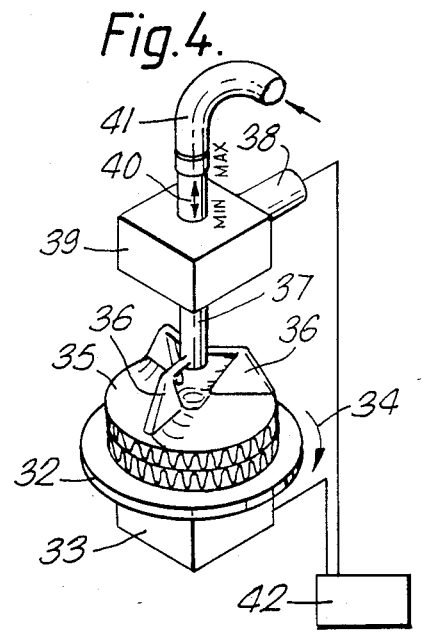
FIG. 4 is a partial perspective view of a third embodiment according to the invention.

The embodiment, as partially shown in FIG. 4, comprises a round support plate 32, which is rotatably mounted on, and drivable by, a motor 33. On the support plate 32, which is driven in the direction as indicated by the arrow 34, extrudable material 35, extruded through three extrusion nozzles 36, is received. By suitably controlling the extrusion velocity and the rotational speed of the support plate 32, differently shaped products can be made. During the extrusion and shaping process, the nozzles 36, which are attached to a common central supply pipe 37 forming a carrier, are gradually moved upwards by actuating a motor 38 which, through a rack and a pinion drive, can move the supply pipe 37 through a fixed bearing block 39 as indicated by a double arrow 40. A flexible hose 41 connects the supply pipe 37 to a supply of extrudable material. Both motor 33 and motor 38 are connected to a common programmable computer 42. If desired, this computer can be used for controlling any valves in the nozzles 36.

The invention also relates to a process of shaping extrudable material, an exemplary embodiment being shown in FIG. 2, by extruding said material through at least one extrusion nozzle 20,21,22, which is arranged with its nozzle opening at some distance from a movable support surface 12 for directly receiving the material extruded therethrough, driving each nozzle for rotation about a common axis which is not an axis of complete rotational symmetry of all nozzles and for translation in at least one direction, the rotation and translation being relatively to the support surface, wherein the rotation and the translation are controlled by a common computer.

According to a preferred embodiment, resulting in shapes of more proper definition, the computer means are also adapted to control valve means arranged at a small distance of particularly not more than 5 and preferably less than 3 cm from the opening of each nozzle, so that, in use, no material will be leaking out of said opening after closing the respective valve.

We claim:

1. Apparatus for shaping extrudable material comprising:
   at least one extrusion nozzle and a movable support surface disposed at a controllable distance from the nozzle for directly receiving extruded product therefrom,
   each nozzle having feeding means for feeding extrudable material thereto and provided with valve means positioned a sufficiently small distance from the nozzle opening as to prevent, in use, leakage of material from the nozzle opening following closure of the valve means,
   all said nozzles being supported on a common carrier which is at least rotatable with respect to said support surface about an axis of rotation other than an axis of complete rotational symmetry of all said nozzles,
   motor means for effecting relative movement between the carrier and the support surface, and
   programmable computer means for programmably controlling said motor means to provide both relative rotational and translational movement in at least one direction between the carrier and the support surface, and for programmably controlling the actuation of the valve means of said nozzles.

2. Apparatus for shaping extrudable material according to claim 1, wherein the valve means of each of said nozzles is positioned at a distance of at most 5 cm from the nozzle opening.

3. Apparatus for shaping extrudable material according to claim 1, wherein said carrier is mounted on a frame having guides along which the carrier is movable in at least two orthogonal directions.

4. Apparatus for shaping extrudable material according to claim 1, wherein said apparatus further comprises means for moving said carrier up and down with respect to the support surface.

5. Apparatus for shaping extrudable material according to claim 1, wherein said apparatus further comprises means for moving the carrier up and down with respect to the support surface, and wherein a conveyor belt forms the movable support surface.

6. Apparatus for shaping extrudable material according to claim 1, wherein the motor means are stepper motors.

7. A process for preparing a shaped food product from extrudable material comprising the steps of:
   extruding the extrudable material from at least one extrusion nozzle provided with valve means positioned sufficiently close to the nozzle opening as to prevent leakage of material from the nozzle opening following closure of the valve means and which is rotatable about an axis of rotation which is non-coincident with any axis of complete rotational symmetry of all nozzles, directly onto a movable support surface which is arranged at some distance below the opening of said at least one nozzle for translational movement relative thereto, and
   using programmable computer means programming the opening and closing of the valve means of said nozzles and the driving of said nozzles in rotation about said axis of rotation and translationally in at least one direction, which rotation and translation is relative to the support surface, to lay down on the movable support surface a food product of desired shape.

8. Apparatus for shaping extrudable material according to claim 1, wherein the valve means of each nozzle is positioned at a distance of at most 3 cm from the nozzle opening.

9. Apparatus for shaping extrudable ice confection material to form a shaped ice confection product, said apparatus comprising:
   a plurality of extrusion nozzles supported on a common carrier rotatable about an axis of rotation which is non-coincident with any axis of complete rotational symmetry of all nozzles, each nozzle having means for feeding ice confection material thereto and having valve means positioned therein at a sufficiently small distance from the nozzle opening to prevent leakage of ice confection material from the nozzle opening following closure of the valve means,
   elongate movable conveyor means disposed below and spaced from the openings of said nozzles for providing a support surface for directly receiving ice confection material extruded from said nozzles,
   first motor means for driving said conveyor means and effecting translational movement of said support surface,
   means including second motor means for driving said carrier in rotation about said axis of rotation and translationally in at least one direction relative to said support surface, and means including a programmable computer for programmably controlling the opening and closing of the valve means of said nozzles and actuation of the first motor means and the means including second motor means so as to lay down on the movable support surface an ice confection product having a shape dependent upon the distance between the nozzle opening and the support surface and the rotational speed of said carrier.

10. Apparatus for shaping extrudable ice confection material according to claim 9, wherein said carrier is supported on a frame having guides along which the carrier is movable in at least two orthogonal directions.

11. Apparatus for shaping extrudable ice confection material according to claim 10, wherein one of said directions of movement of the carrier is up and down relative to the support surface for adjusting the distance between the nozzles and the support surface.

12. Apparatus for shaping extrudable ice confection material according to claim 9, wherein the valve means of each nozzle is positioned at a distance of at most 5 cm. from the nozzle opening.

13. A process for preparing a shaped ice confection product from extrudable ice confection material comprising the steps of:

extruding the extrudable ice confection material from three extrusion nozzles each having valve means therein positioned sufficiently close to the nozzle opening as to prevent leakage of material therefrom following closure of the valve means, and all supported in angularly spaced relationship on a common carrier which is rotatable about a vertically-oriented axis of rotation, downwardly onto a horizontally-oriented support surface provided by an elongate conveyor arranged some distance below the nozzle openings and travelling in a direction orthogonal to the axis of rotation of the carrier, and using programmable computer means programming the travel of said conveyor, the opening and closing of the valve means in said nozzles, and direction and speed of rotation of said carrier to form on the support surface an ice confection product of desired shape.

* * * * *